US008615956B2

(12) United States Patent
Valente et al.

(10) Patent No.: US 8,615,956 B2
(45) Date of Patent: Dec. 31, 2013

(54) PANEL STRUCTURE

(75) Inventors: Antonio Valente, Porto Salva (PT); Tero Taulavuori, Tornio (FI); Jukka Säynäjäkangas, Rovaniemi (FI); Antero Kyröläinen, Pattijoki (FI)

(73) Assignee: Outokumpu Oyj, Espoo (FI)

( * ) Notice: Subject to any disclaimer, the term of this patent is extended or adjusted under 35 U.S.C. 154(b) by 112 days.

(21) Appl. No.: 12/677,271

(22) PCT Filed: Sep. 3, 2008

(86) PCT No.: PCT/FI2008/050482
§ 371 (c)(1),
(2), (4) Date: Mar. 9, 2010

(87) PCT Pub. No.: WO2009/034226
PCT Pub. Date: Mar. 19, 2009

(65) Prior Publication Data
US 2010/0186336 A1 Jul. 29, 2010

(30) Foreign Application Priority Data

Sep. 11, 2007 (FI) .................................. 20070691

(51) Int. Cl.
*E04B 1/00* (2006.01)
*E04B 1/18* (2006.01)
*E04C 2/24* (2006.01)

(52) U.S. Cl.
USPC .......................... 52/633; 52/783.1; 52/783.11

(58) Field of Classification Search
USPC ................. 52/633–639, 783.11, 783.1
See application file for complete search history.

(56) References Cited

U.S. PATENT DOCUMENTS

| 1,576,559 | A | | 3/1926 | Swift |
| 3,008,551 | A | | 11/1961 | Cole |
| 3,673,057 | A | | 6/1972 | Fairbanks |
| 3,793,791 | A | | 2/1974 | Wootten |
| 4,039,708 | A | * | 8/1977 | Okada ............................. 428/73 |
| 4,087,302 | A | * | 5/1978 | Wootten ....................... 156/204 |
| 4,139,670 | A | | 2/1979 | Fehlmann |
| 6,200,664 | B1 | * | 3/2001 | Figge et al. ................... 428/178 |
| 6,207,256 | B1 | * | 3/2001 | Tashiro ........................ 428/178 |
| 6,644,535 | B2 | * | 11/2003 | Wallach et al. ............ 228/173.5 |
| 6,939,599 | B2 | * | 9/2005 | Clark ............................ 428/178 |
| 7,288,326 | B2 | * | 10/2007 | Elzey et al. ................... 428/593 |
| 7,424,967 | B2 | * | 9/2008 | Ervin et al. ................... 228/193 |

(Continued)

FOREIGN PATENT DOCUMENTS

FR 2786746 A1 6/2000

OTHER PUBLICATIONS

Matti Santero, International Search Report for PCT/FI2008/050482, Dec. 2, 2008.

*Primary Examiner* — Mark Wendell
(74) *Attorney, Agent, or Firm* — Chernoff Vilhauer McClung & Stenzel LLP

(57) ABSTRACT

The invention relates to a panel structure, in which structure at least two layer sheets (1,6;12,13;22,23;31,32;41,44,45) are fixed to each other with at least one connection member (2,11,21,33,42,43,46) and the connection member (2,11,21, 33,42,43,46) is generated from one of the at least two layer sheets (1,6;12,13;22,23;31,32;41,44,45). At least part of the connection member (2,11,21,33,42,43,46) is diverged from the layer sheets (1,6;12,13;22,23; 31,32;41,44,45) forming at least one opening (8,17,27,35) through the layer sheet (1,6; 12,13;22,23;31,32;41,44,45) wherefrom the connection (2,11,21,33, 42,43,46) is generated.

20 Claims, 5 Drawing Sheets

(56) References Cited

U.S. PATENT DOCUMENTS

Figure 1:
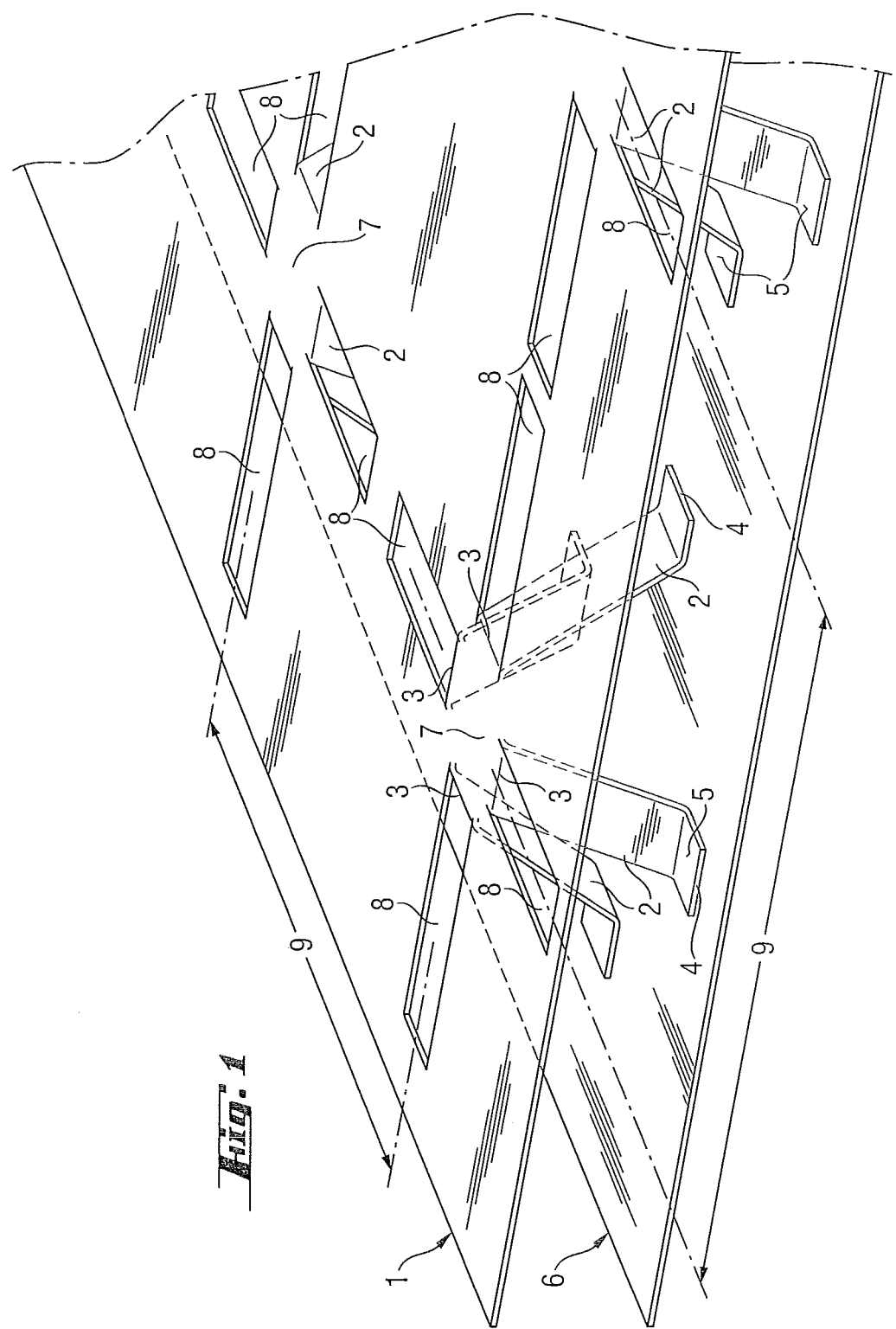

| | | | |
|---|---|---|---|
| 2002/0020134 A1* | 2/2002 | Collard | 52/694 |
| 2005/0183376 A1* | 8/2005 | Shoji | 52/633 |
| 2007/0011983 A1* | 1/2007 | Reynolds et al. | 52/633 |
| 2007/0020441 A1* | 1/2007 | Kim et al. | 428/180 |
| 2007/0169432 A1* | 7/2007 | Bridge | 52/783.1 |
| 2008/0155931 A1* | 7/2008 | Shoji | 52/633 |

* cited by examiner

PANEL STRUCTURE

This invention relates a panel structure wherein the core structure is formed from layer sheets without any addition of core material. The layer sheets are mechanically connected to each other using at least one connection member formed from one of the layer sheets.

Honeycomb, foam and corrugated cores are widely used between the structural skins (layer sheets) for lightweight sandwich panel structures. Honeycomb cores have a closed cell structure and panels with honeycomb cores are well suited for thermal protection, and provide efficient load support. Sandwich panels with honeycomb cores are described for instance in the JP patent application 2006-130734 and in the EP patent application 1,285,935. A corrugated core structure for sandwich panels provides less efficient and highly anisotropic load support, but the corrugated core structure enables cross flow heat exchange opportunities, because the pores are continuous in one direction. Corrugated core structures for sandwich panels are described for instance in the JP patent applications 2001-138043 and 2004-090241, in the WO patent application 2005/058593 and in the U.S. Pat. No. 7,041,187. Recent advances in sandwich panel design and fabrication have led to the emergence of lattice supporting structures with open cell structures. Fully open cell structures can be created from slender beams (trusses), which are separated from the layer sheets and which can be of any cross-sectional shape, such as circular, square or hollow. A truss core sandwich panel is described for instance in the U.S. Pat. No. 6,644,535.

Sandwich panel structures having honeycomb, foam or corrugated core structure can be fabricated from a wide variety of metallic, polymeric or composite materials. Many sandwich panel structures are found to provide adequate stiffness and strength for structural load support. Sandwich panels with the core relative densities of 2-10% and cell sizes in the millimeter range are assessed for use as multifunctional structures. The open and three-dimensional pore networks of lattice supporting structures create opportunities for simultaneously supporting high stresses and also cross flow heat exchange. These highly compressible structures achieve opportunities for mitigation of high intensity dynamic loads created by impacts and shock waves in air or water. By filling the voids with polymers and/or hard ceramics, these open three-dimensional structures have also been found to offer significant resistance to penetration by projectiles or the like.

The US patent application 2007/0020441 relates to an open core for a sandwich panel being manufactured by deep drawing. The open deep drawing core is obtained by forming a great number of a sort of hollow parts in any one surface of the upper or lower directions of a metal plate. The hollow parts have a flat bottom on the metal plate and the hollow parts are sunk only in any one direction of the upper or lower directions of the metal plate, e.g. downwardly or alternately downwardly and upwardly therefrom. The sandwich panel of the US patent application 2007/0020441 is also provided with a V type groove to be cut and bent when the sandwich panel is made.

The core structure of the US patent application 2007/0020441 is more practical for the cross flow than the corrugated core structure, because the hollow parts with flat bottoms give opportunities to flow in more than one direction. However, this has a drawback in that it can be difficult to fill the core with desired filling medium. Further, the flat bottom of a hollow part is a contact surface with the cover plate, which effectively dictates the thickness and weight of the panel, and thus panel thickness limitations are experienced due to deep drawing limits.

The object of the present invention is to prevent some drawbacks of the prior art and to achieve an improved panel structure, which is easy to manufacture and easy to add the core material, if needed, and in which the contact surface between different layer sheets is minimized. The essential features of the present invention are enlisted in the appended claims.

In accordance with the present invention a panel structure is manufactured from layer sheets so that at least two layer sheets are mechanically connected to each other using at least one connection member formed from one of at least two layer sheets. At least one part of the connection member is diverged from the layer sheets in order to form at least one opening through the layer sheet, which is used to generate the connection member. The layer sheet is provided with at least one connection member having a mechanical connection with one adjacent layer sheet. The layer sheet can also provide at least one connection member having a mechanical connection with at least one non-adjacent layer sheet. The layer sheet which is used to generate the connection member is in the following described as the first layer sheet, and the layer sheet whereto the connection member is fixed is respectively described as the second layer sheet.

The connection member between two layer sheets is advantageously manufactured so that the first layer sheet is first cut along at least one cutting line in order create the desired area on the first layer sheet for the connection member. At least one part of the perimeter defining the area for the connection member is not cut and thereby not separated from the layer sheet. A desired projection of the connection member is achieved when the first layer sheet is pressed and then bent in the area of the at least one cutting line. During bending the connection member is shaped so that at least one part of the connection member creates a surface, which is diverged from the first layer sheet and is mechanically connectable with the second layer sheet, which may be advantageously adjacent to the first layer sheet. Dependent on the thickness of the first layer sheet the connection member can also be manufactured in one cutting operation, wherein the first layer sheet is pressed to separate a desired projection to the connection member. In this case at least one part of the perimeter defining the area for the connection member is not pressed and thus maintains the integrity and connection with the first layer sheet. The part of the connection member separated from the first layer sheet is further bent in order to shape the desired connection member. The connection member is still a part of the first layer sheet, because at least one part of the connection member is kept connected with the first layer sheet.

In the connection member for the panel structure according to the invention at least one desired area of the connection member separated from the first layer sheet is advantageously shaped as a fixing surface. The fixing surface is shaped to be connectable with the surface area of the second layer sheet whereto the connection member is connected by means of the fixing surface. Advantageously the fixing surface is at least partly parallel with the surface of the second layer sheet. The connecting member is fixed to the layer sheet by way of any joining process such as, but not limited to, welding, soldering, adhesive bonding and mechanical fastening.

In one preferred embodiment of the invention the fixing surface is formed in the area close to the end of the connection member opposite to the end of the connection member, which is connected with the first layer sheet.

In another preferred embodiment of the invention both the ends of the connection member are kept connected with the first layer sheet and the fixing surface is shaped advantageously essentially close to the centre part of the connection member in the longitudinal direction. In the embodiment where both the ends of the connection member are kept connected with the first layer sheet it is possible to shape more than one fixing surface for the connection member. The fixing surface of the connection member then consists of at least two parts, which are situated essentially symmetrically to the centre part of the connection member. In the case where both the ends of the connection member are kept connected with the first layer sheet the part separated from the first layer sheet can also be cut into two parts having the same length or having essentially different lengths, in which case one part is much longer than the second part. Each of these parts is then shaped into an individual connection member having its own fixing surface.

The distance between two layer sheets in the panel structure of the invention can be adjusted by means of the angle created between the first layer sheet and the connection member at that position wherein the connection member is diverged from the first layer sheet. When the angle is small, the layer sheets are positioned closer to each other and conversely when the angle is large, the layer sheets are positioned further away from each other.

When manufacturing according to the invention the panel structure containing at least two layer sheets a plurality of the connection members is required in order that the panel structure is stable enough. In one preferred embodiment the connection members are arranged in one or more groups of four connection members, wherein the four connection members are placed in a perpendicular position to each other with respect to the end of the connection members that is kept connected with the first layer sheet. When two or more groups of the connection members are used, the groups are advantageously situated from each other to offer good stability to the overall panel structure.

In another preferred embodiment of the invention the connection members between two layer sheets are separately arranged from each other so that the connection members are advantageously situated from each other so as to offer good stability for the panel structure. The connection members separately arranged from each other can be also situated so that two adjacent connection members are in perpendicular position to each other at the end of the connection members that are kept connected with the first layer sheet.

In still another preferred embodiment the connection members of the first layer sheet can be positioned so that the first layer sheet is connectable with two or more layer sheets, which may be situated on one or both sides of the first layer sheet thus creating a multi-layer structure. The connection member of the invention can also be shaped so that the connection member is positioned between two layer sheets and at least one additional layer sheet is positioned between these two layer sheets. The connection member between the first layer sheet and the second layer sheet is then conveyed through the additional layer sheet by means of the opening achieved in the additional layer sheet. The opening is advantageously created when a connection member is shaped between the additional layer sheet and the second layer sheet. The opening can also be created for the reason to have an opening for this connection member between the first layer sheet and the second layer sheet.

Considering multi-layer structures of the invention, the connection members both between the first layer sheet and the second layer sheet of the additional layer sheets can be created advantageously in the case when both the ends of the connection member are kept connected with the first layer sheet and the part separated from the first layer sheet is cut into two parts so that one part is much longer than the other part. Thus the connection member thereby shaped can be used to join the first layer sheet to the array of layer sheets at predetermined distances and positions. For instance, the connection member shaped from the longer part is connected with the second layer sheet, and the connection member shaped from the other part is connected with additional layer sheet positioned between the first and the second layer sheets.

The connection member of the invention has preferably straight edges, but the edges of the connection member can also be at least partly curved having for instance partly oval and/or circular shapes. Using different geometries for each individual connection member or for groups of the connection members it is possible to design the mechanical properties of the panel structure desired for different applications.

The layer sheets of the panel structure according to the invention can be essentially flat or the layer sheets can also be curved or the layer sheets can further be a combination of flat and curved parts so that at least one part is flat or at least one part is curved. The connection members between two layer sheets are shaped so that the fixing surfaces of the connection members are in every point of the panel structure independent on the shape of the first layer sheet parallel to the surface shape of the second layer sheet in order that a desired mechanical contact between two layer sheets is achieved.

The present invention is of advantage in the creation not only two layer sheet panel structures but also for multi-layer panel structures. Furthermore through varying the length of the connection members, layer sheet profiles can be retained in the final structure. Thus for example where a layer sheet has a curved or other profile this can be maintained even when joining to a flat layer sheet as the lengths of the connection members from/to the profiled layer sheet can be varied across the sheet so as to retain the curved shape.

The panel structure of the invention can be manufactured from different materials, such as metal, polymer, glass fibre reinforced plastics, carbon fibre, aramid fibre, fibre metal laminates and ceramics and their combinations or composite material. One advantageous metal for the invention is stainless steel, and another advantageous metal is aluminium. The manufacturing material or a combination of materials are at least partly dependent on the use of the panel structure, because the panel structure of the invention is suitable for instance for transport applications containing bus, rail and road applications as well as building and decorative applications.

Figure 2:
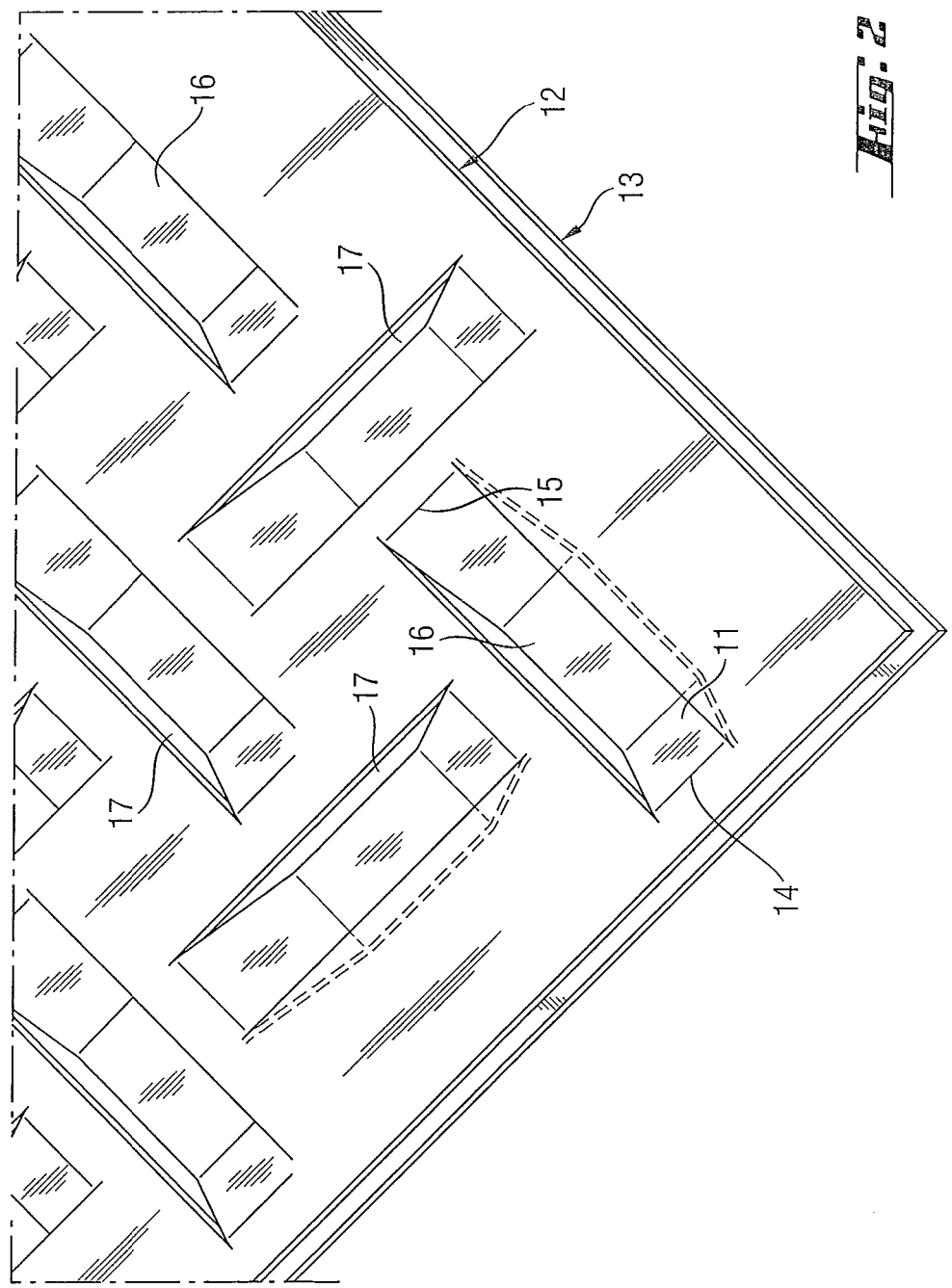
Figure 3:
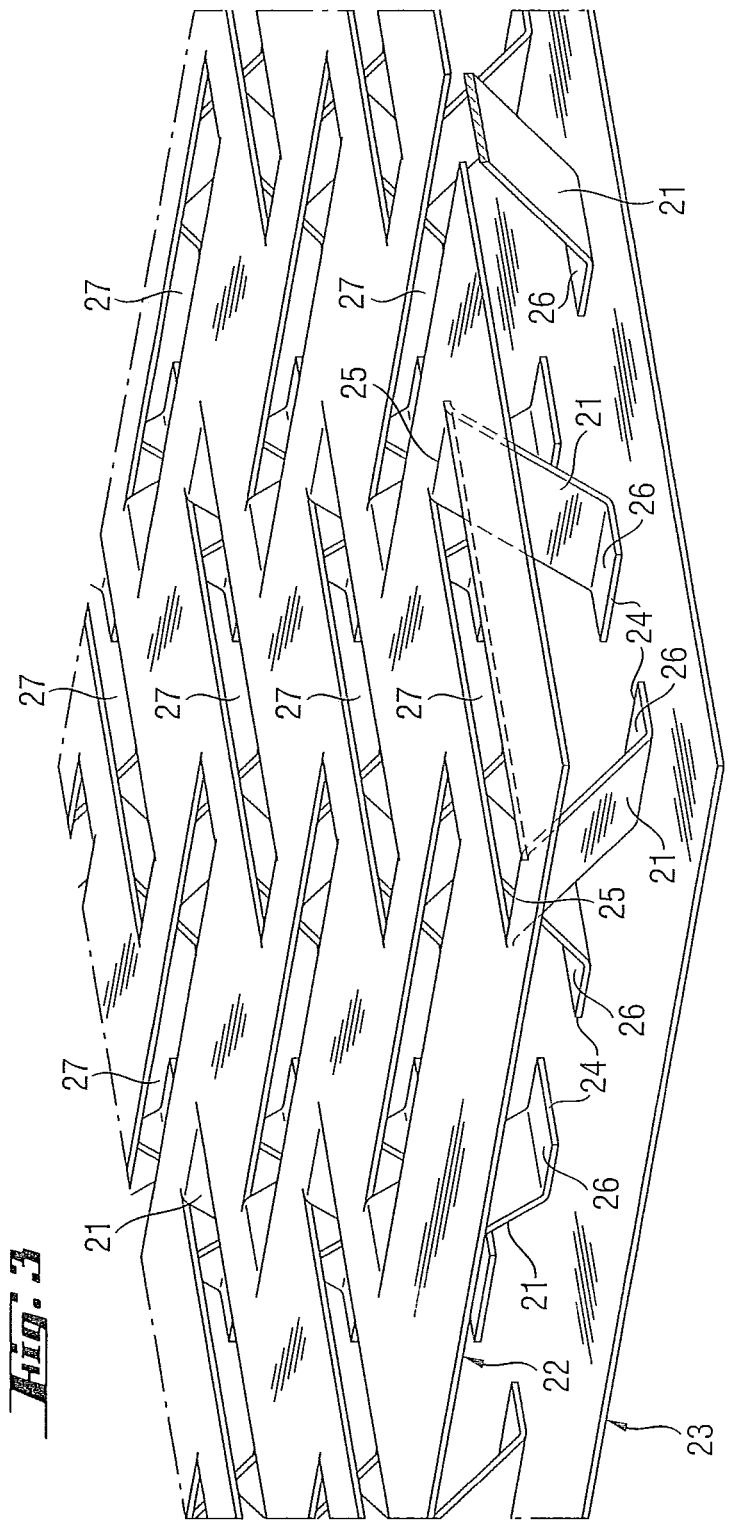
Figure 4:
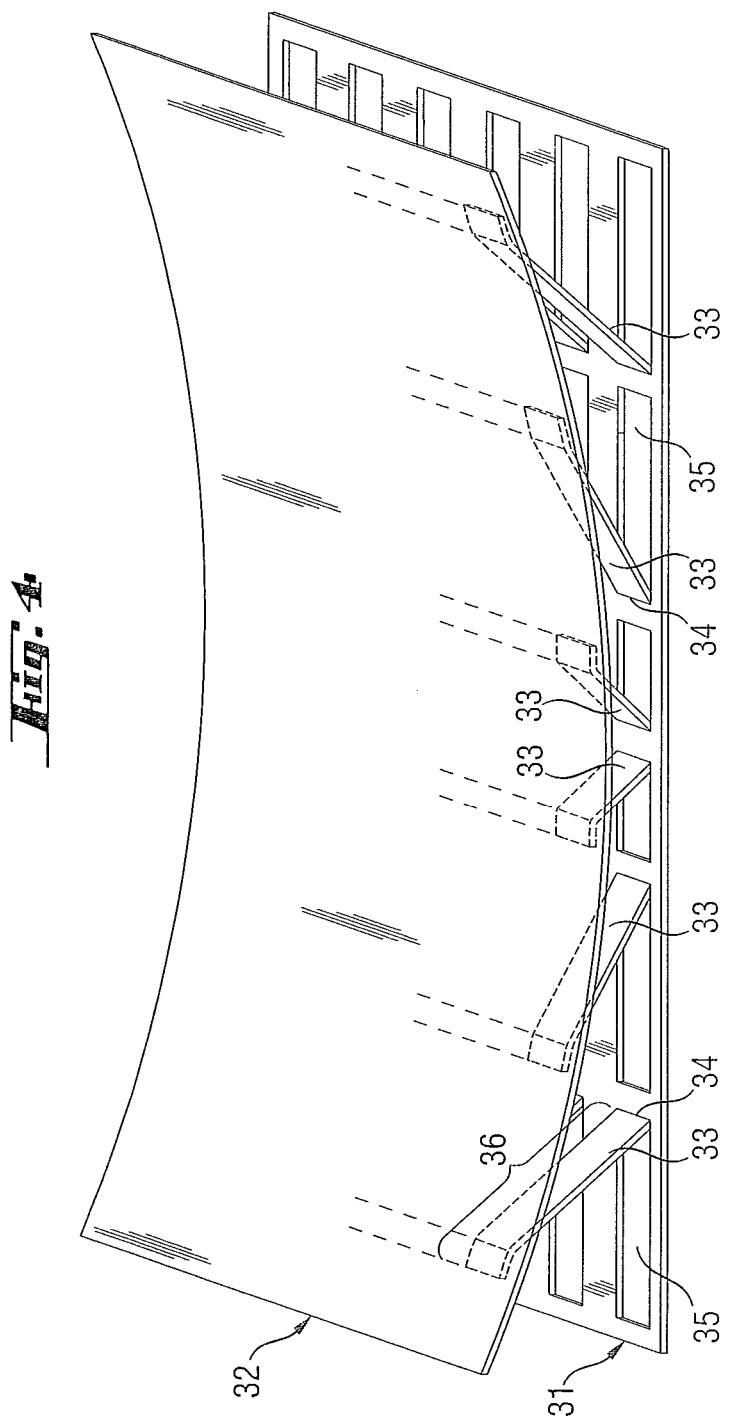
Figure 5:
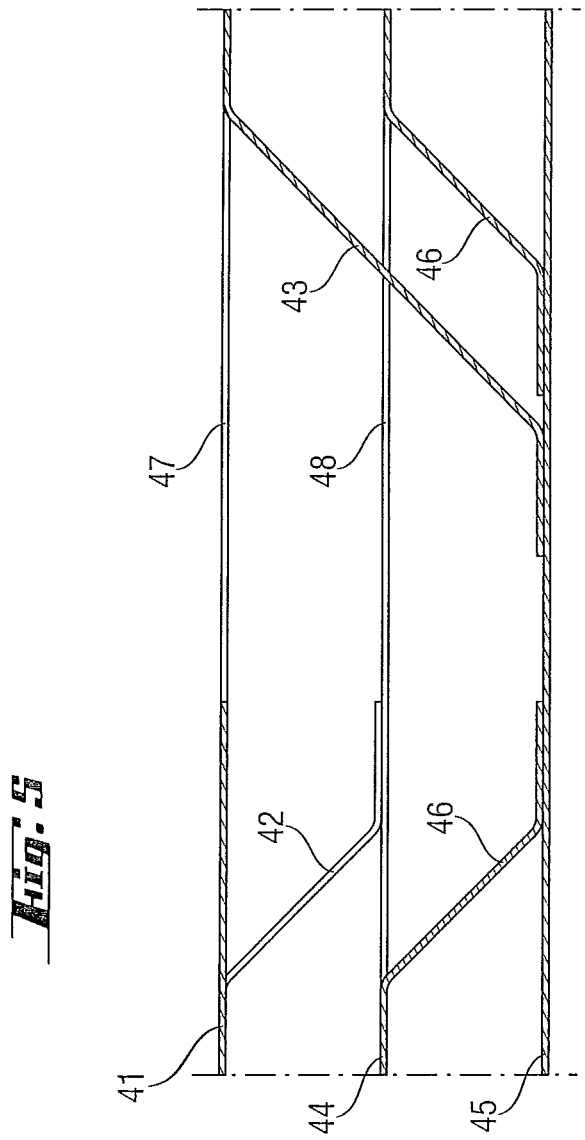

The present invention is described in more details referring to the enclosed drawings, wherein FIG. 1 illustrates partly one preferred embodiment of the invention in a perspective view, FIG. 2 illustrates partly another preferred embodiment of the invention in a perspective view, FIG. 3 illustrates partly still another preferred embodiment of the invention in a perspective view, FIG. 4 illustrates partly still one preferred embodiment of the invention in a perspective view, FIG. 5 illustrates partly one preferred embodiment of the invention in a schematic section view.

In accordance with FIG. 1 a first layer sheet 1 is provided with connection members 2. One end 3 of the connection members 2 is retained and connected to the first layer sheet 1. The other end 4 of the connection members 2 opposite to the connected end 3 is provided with a fixing surface 5, which is parallel to the surface of the second layer sheet 6. The fixing surface 5 is fastened using any joining technique with the second layer sheet 6 in order to achieve a mechanical connection between the layer sheets 1 and 6. An opening 8 to the first layer sheet 1 is achieved when part of the connection member 2 diverges from the first layer sheet 1.

The connection members 2 are situated in a group of four connection members 2. The end parts 3 of the connection members 2 connecting to the first layer sheet 1 are in perpendicular position to each other so that a square area 7 is formed between the end parts 3. The groups of connection members 2 containing four connection members 2 are situated from each other in an essentially equal distance 9. More than one group of connecting members may be used, as illustrated.

In FIG. 2 the connection member 11 between two layer sheets 12 and 13 is shaped so that both the ends 14 and 15 of the connection member 11 are retained as connected to the first layer sheet 12. The connection member 11 has a fixing surface 16 in a centre part of the connection member 11. The connection member 11 is fastened with the fixing surface 16 to the second layer sheet 13. An opening 17 to the first layer sheet 12 is achieved when part of the connection member 11 diverges from the first layer sheet 12.

In FIG. 3 connection members 21 are achieved between two adjacent layer sheets 22 and 23. At the end 24 of the connection member 21 opposite to the end 25 being still connected to part of the first layer sheet 22 there is created a fixing surface 26 in order to fasten the connection member 21 to the second layer sheet 23. The ends 25 of two adjacent connection members 21 are situated in perpendicular position to each other. An opening 27 to the first layer sheet 22 is achieved when part of the connection member 21 diverges from the first layer sheet 22.

In FIG. 4 the first layer sheet 31 is flat and the second layer sheet 32 is made curved. For the panel structure the connection members 33 are constructed from the first flat layer sheet 31 so that the connection members 33 are in parallel position to each other. The connection members 33 are also arranged advantageously so that the ends 34 connected to the first layer sheet 31 of two straight connection members 33 are positioned close to each other, when possible. The length 36 of the connection members 33 can be varied across the structure so that a curved profile of the second layer sheet 32 is retained. An opening 35 to the first layer sheet 31 is achieved when part of the connection member 33 diverges from the first layer sheet 31.

FIG. 5 illustrates the layer sheet 41, which has connection members 42 and 43. The connection member 42 creates a mechanical connection to the layer sheet 44 adjacent to the layer sheet 41. The connection member 43 forms an opening 47 and is so shaped that a mechanical connection from the layer sheet 41 to the layer sheet 45 is achieved. The layer sheet 45 is adjacent to the layer sheet 44, but not to the layer sheet 41. The connection members 46 are based on the layer sheet 44 and the connection members 46 form an opening 48 in the layer sheet 44 through which opening the connection member 43 has a mechanical connection from the layer sheet 41 to the layer sheet 45.

The invention claimed is:

1. A panel structure comprising at least first and second layer sheets each comprising a main sheet portion, wherein at least the first layer sheet is made of metal and comprises a plurality of elongate connection members that diverge from the main sheet portion of the first layer sheet and form openings through the main sheet portion of the first layer sheet, each of said connection members has a first end that is proximal to the main sheet portion of the first layer sheet and at which the connection member is attached to the main sheet portion of the first layer sheet and an opposite second end portion that is distal from the main sheet portion of the first layer sheet, said connection member is directly fixed at its second end portion to the main sheet portion of the second layer sheet, and the first layer sheet comprises a single connection member for each opening through the main sheet portion of the first layer sheet.

2. A panel structure according to claim 1, wherein the connection member is directly fixed at its second end portion to the second layer sheet by welding, soldering or adhesive bonding.

3. A panel structure according to claim 1, wherein the connection member is directly fixed at its second end portion to the second layer sheet by mechanical fastening.

4. A panel structure according to claim 1, wherein an intermediate part of the connection member, between said proximal end and said distal end portion, has edges that are straight.

5. A panel structure according to claim 1, wherein an intermediate part of the connection member, between said proximal end and said distal end portion, has edges that are at least partly curved.

6. A panel structure according to claim 1, wherein at least the first layer sheet is at least partly curved.

7. A panel structure according to claim 1, wherein the first layer sheet is made of stainless steel or aluminum.

8. A panel structure according to claim 1, wherein the second layer sheet comprises polymer material, glass fiber reinforced plastic material, carbon fiber material, aramid fiber material, fiber metal laminate material, or ceramic material.

9. A panel structure according to claim 1, wherein two of the connection members are substantially straight and form respective mutually aligned openings in the main sheet portion.

10. A panel structure according to claim 1, wherein two of the connection members are substantially straight and form a single opening in the main sheet portion.

11. A panel structure according to claim 1, wherein four of the connection members are substantially straight and form first, second, third and fourth openings respectively in the main sheet portion, the first and second openings being mutually aligned, the third and fourth openings being mutually aligned, and the first and second openings being substantially perpendicular to the third and fourth openings.

12. A panel structure according to claim 1, wherein the second layer sheet comprises a plurality of elongate connection members that diverge from the main sheet portion of the second layer sheet and form openings through the main sheet portion of the second layer sheet, each of said connection members diverging from the main sheet portion of the second layer sheet has a first end that is proximal to the main sheet portion of the second layer sheet and at which the connection member is attached to the main sheet portion of the second layer sheet and an opposite second end portion that is distal from the main sheet portion of the second layer sheet, and said connection member is directly fixed at its second end portion to the main sheet portion of the first layer sheet.

13. A panel structure according to claim 1, wherein each connection member comprises an intermediate portion between its first end and its second end portion, the intermediate portion is oblique to the main sheet portion of the first layer sheet, and the second end portion of each connection member is parallel to and directly fixed to the main sheet portion of the second layer sheet.

14. A panel structure according to claim 1, wherein the second layer sheet is made of metal.

15. A panel structure comprising at least first, second and third layer sheets each comprising a main sheet portion, wherein the second layer sheet is disposed between the first and third layer sheets, at least the third layer sheet comprises first and second pluralities of elongate connection members that diverge from the main sheet portion of the third layer sheet and form openings through the main sheet portion of the third layer sheet, each of said connection members has a first end that is proximal to the main sheet portion of the third layer sheet and at which the connection member is attached to the main sheet portion of the third layer sheet and an opposite second end portion that is distal from the main sheet portion of the third layer sheet, each connection member of the first plurality is fixed at its second end portion to the main sheet portion of the first layer sheet, and each connection member of the second plurality is fixed at its second end portion to the main sheet portion of the second layer sheet.

16. A panel structure according to claim 15, wherein the second layer sheet comprises a main sheet portion and a plurality of elongate connection members that diverge from the main sheet portion of the second layer sheet and form openings through the main sheet portion of the second layer sheet, each of said connection members of the second layer sheet has a first end that is proximal to the main sheet portion of the second layer sheet and at which the connection member is attached to the main sheet portion of the second layer sheet and an opposite second end portion that is distal from the main sheet and is fixed at its second end portion to the first layer sheet, and the connection members of said first plurality extend through at least one of said openings in the main sheet portion of the second layer sheet.

17. A panel structure according to claim 15, wherein each connection member of the first plurality comprises an intermediate portion between its first end and its second end portion, the intermediate portion is oblique to the main sheet portion of the third layer sheet, and the second end portion of each connection member of the first plurality is parallel to and directly fixed to the main sheet portion of the first layer sheet.

18. A panel structure according to claim 15, wherein each connection member of the second plurality comprises an intermediate portion between its first end and its second end portion, the intermediate portion is oblique to the main sheet portion of the third layer sheet, and the second end portion of each connection member of the second plurality is parallel to and directly fixed to the main sheet portion of the second layer sheet.

19. A panel structure according to claim 15, wherein the second layer sheet is in spaced parallel relationship with the first and third layer sheets.

20. A panel structure comprising at least first and second layer sheets each comprising a main sheet portion,
    wherein the first and second layer sheets each comprise a plurality of elongate connection members that diverge from the main sheet portion of the respective layer sheet and form openings through the main sheet portion of the respective layer sheet,
    each of said connection members of the first layer sheet has a first end that is proximal to the main sheet portion of the first layer sheet and at which the connection member is attached to the main sheet portion of the first layer sheet and an opposite second end portion that is distal from the main sheet portion of the first layer sheet,
    said connection member of the first layer sheet is directly fixed at its second end portion to the main sheet portion of the second layer sheet,
    each of said connection members of the second layer sheet has a first end that is proximal to the main sheet portion of the second layer sheet and at which the connection member is attached to the main sheet portion of the second layer sheet and an opposite second end portion that is distal from the main sheet portion of the second layer sheet,
    said connection member of the second layer sheet is directly fixed at its second end portion to the main sheet portion of the first layer sheet,
    each of said connection members of the second layer sheet comprises an intermediate portion between its first end and its second end portion,
    the intermediate portion of each such connection member is oblique to the main sheet portion of the second layer sheet, and
    the second end portion of each such connection member is parallel to and directly fixed to the main sheet portion of the first layer sheet.

* * * * *